Figure 1:
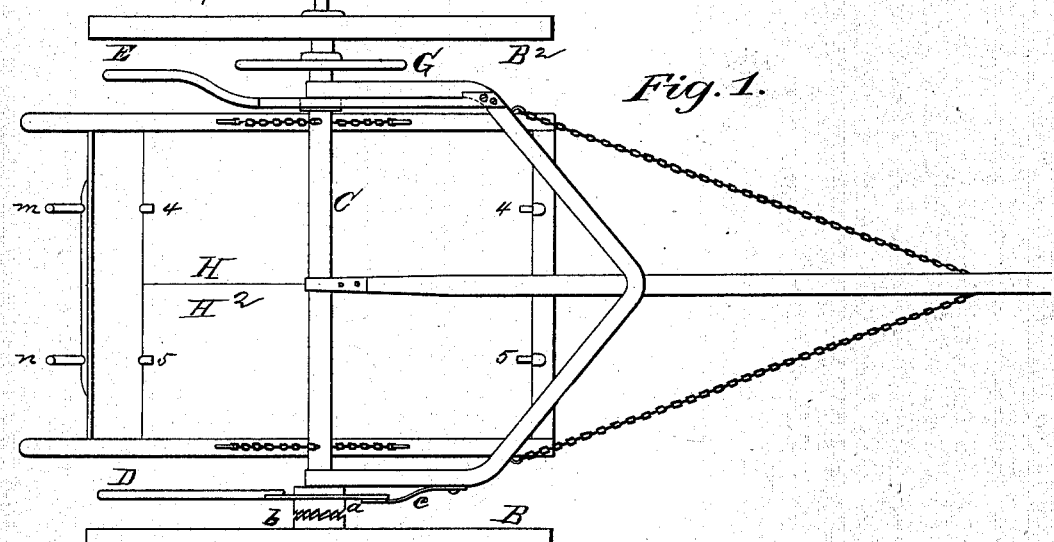
Figure 2:
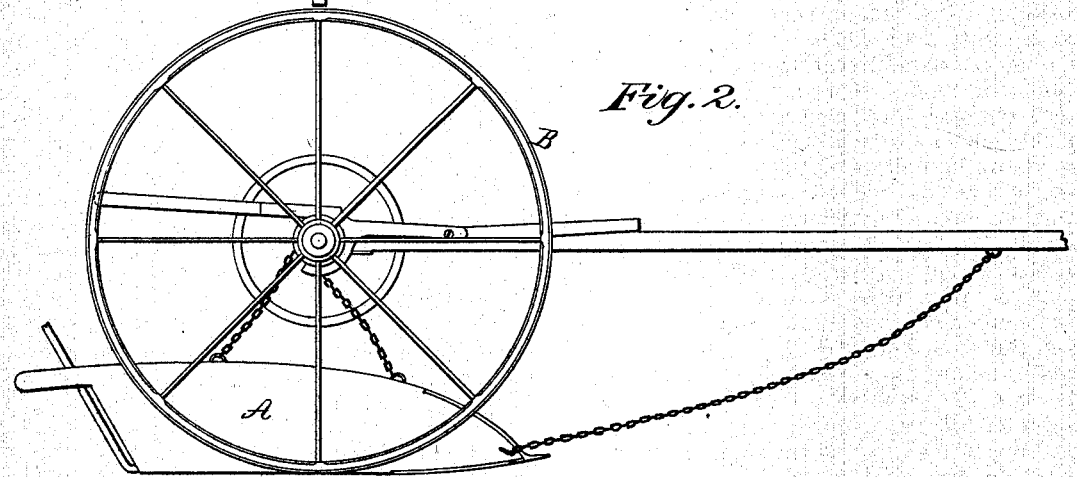
Figure 3:
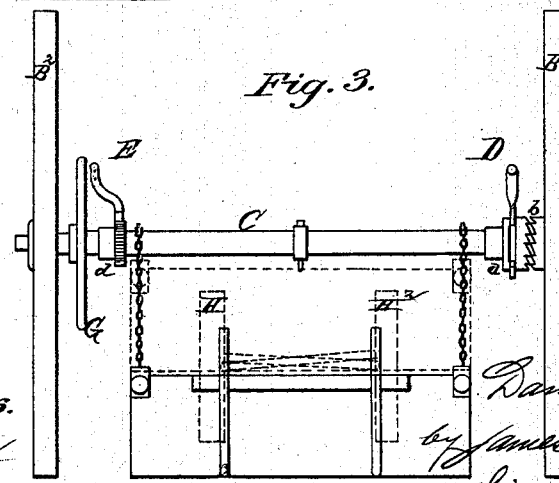

D. S. HAMILTON.
Road-Scrapers.

No. 139,669.　　　　　　　　　Patented June 10, 1873.

Witnesses.　　　　　　　　　Daniel S. Hamilton
　　　　　　　　　　　　　　　　Inventor.
　　　　　　　　　　　by James H. Mandeville
　　　　　　　　　　　　　attorney in fact,
　　　　　　　　　　　　Lincoln & Willard
　　　　　　　　　　　　attorneys of record

UNITED STATES PATENT OFFICE.

DANIEL S. HAMILTON, OF ELMIRA, NEW YORK.

IMPROVEMENT IN ROAD-SCRAPERS.

Specification forming part of Letters Patent No. 139,669, dated June 10, 1873; application filed February 10, 1873.

*To all whom it may concern:*

Be it known that I, DANIEL S. HAMILTON, of the city of Elmira, in the county of Chemung, in the State of New York, have invented certain new and useful Improvements in Road-Scrapers, of which the following, taken in connection with the accompanying drawings, is a full, clear, and exact description.

The objects of this invention are, to construct a larger scraper than could be practically worked in the old way of hauling it over the ground; to make it of the least possible number of parts, divesting the carriage of all frame-work, thus combining lightness with great strength, and occasioning less fatigue to the horses; to enable the contents excavated and hauled away to be dumped in the precise place desired without requiring severe exertion on the part of the attendant, and without having to overturn the scraper; also to furnish such a scraper as may be built upon an enlarged scale, and yet without being cumbersome, for the removal of snow from the streets of cities. The invention consists in mounting a road-scraper directly upon the axle of a two-wheel carriage that is divested of all frame-work, in such a manner that by throwing a spring-clutch upon the axle into gear with a ratchet that is formed upon the inside of the hub of one of the wheels the scraper will be elevated by causing the axle to revolve with the wheels, and thus wind upon it the chains which suspend the scraper from the axle; and that by lifting a spring-lever which hooks into a fixed ratchet-wheel near the opposite end of the axle from the clutch the scraper will instantly descend by its gravity to the ground. The invention further consists in providing a road-scraper with a hinged bottom, so that its contents may be emptied without turning over the scraper, simply by turning the two half bottoms upon their sides or into a vertical position.

In the drawings, Figure I represents a plan view; Fig. II, a side elevation; and Fig. III, an end or rear view of the scraper. A represents the scraper; B B$^2$, the wheels between which it is mounted; and C the axle upon which the chains of the scraper are wound. D shows the lever for throwing a clutch, $a$, into gear with a ratchet, $b$, on the hub of the wheel B. As this clutch turns with the axle C, it is evident that when they are in gear the chains will be wound upon the axle, and the scraper soon elevated into the position shown in dotted lines in Fig. III. The clutch-lever D is held out of position by means of a spring, $c$, so that the chains can not be wound upon the axle until the moment arrives when the attendant desires to raise the scraper. E illustrates the spring-lever catch that engages with another ratchet-wheel, $d$, arranged upon the axle, and upon the other side of the scraper from the clutch $a$, but within the wheel B$^2$; and it is made a spring-lever catch so that it will easily ride over the cogs of the ratchet-wheel, but always remain in contact therewith until it is lifted out by the attendant. G represents a hand-wheel upon the axle near the fixed ratchet-wheel $d$, and which is turned by the attendant, should occasion require, so that the chains may be assisted upon the start in being wound upon the axle, which might be necessary when the scraper is carrying a very heavy load. The bottom of the scraper is constructed in two parts, or, in other words, the scraper has two half-bottoms, H H$^2$, each hinged preferably a little off its center, at 4 5, so that the handles $m$ $n$, attached to each half-bottom, when pulled out of their notches by the attendant, will permit the contents of the scraper from their weight to turn the half-bottoms into the position shown in dotted lines in Fig. III. It is obvious that a scraper made and mounted as above described can carry a great quantity of earth, and with little fatigue both to the attendant and his horses.

I am aware that road-scrapers heretofore have been mounted upon a two-wheel carriage, provided with a frame-work containing gear-wheels, windlasses, and other machinery for elevating or lowering the scraper; this, however, is not my invention, which is, on the contrary, an elimination of all such cumbersome devices formerly in use for this purpose.

What I claim as new, and desire to secure by Letters Patent, is—

1. A road-scraper suspended directly from the axle of a two-wheel carriage, and elevated or lowered by winding or unwinding chains or ropes, that are attached directly to the carriage-axle.

2. A road-scraper constructed with two half-bottoms, each hinged a little off its center, so that the contents thereof may be emptied without overturning the scraper, substantially as herein described.

3. The combination of the spring-lever D with the clutch $a$, ratchet $b$, and the axle C, for elevating the scraper by winding the chains by which it is suspended directly upon the axle of the carriage, substantially as described.

4. The releasing mechanism herein described, consisting of the combination of a spring-lever catch with a fixed ratchet-wheel upon the axle of the carriage, so that when the catch is lifted out of the wheel the scraper may descend by its gravity to the ground.

In witness whereof I have hereunto signed my name in the presence of two attesting witnesses, at Elmira, in the State of New York, this 8th day of February, 1873.

DANIEL S. HAMILTON. [L. S.]

Witnesses:
CHAS. P. THURSTON,
ARIEL S. THURSTON.